United States Patent [19]

Sausner et al.

[11] Patent Number: 4,781,161

[45] Date of Patent: Nov. 1, 1988

[54] SETTING MEMBER FOR CONTROLLING THE QUANTITATIVE FLOW OF A FLUID

[75] Inventors: Andreas Sausner, Frankfurt am Main; Wolfgang Göcking, Neu-Anspach, both of Fed. Rep. of Germany

[73] Assignee: VDO Adolf Schindling AG, Frankfurt/Main, Fed. Rep. of Germany

[21] Appl. No.: 25,618

[22] Filed: Mar. 13, 1987

[30] Foreign Application Priority Data

Mar. 20, 1986 [DE]  Fed. Rep. of Germany ....... 3609438

[51] Int. Cl.$^4$ ............................................ F02D 41/16
[52] U.S. Cl. ...................................... 123/339; 138/45; 138/46
[58] Field of Search .................. 123/339; 137/129.15, 137/129.17; 138/43, 44, 45, 46

[56] References Cited

U.S. PATENT DOCUMENTS

| | | | |
|---|---|---|---|
| 1,328,235 | 1/1920 | Lane | 138/45 |
| 1,427,485 | 8/1922 | Lindberg | 138/46 X |
| 2,889,850 | 6/1959 | Eberline | 138/46 X |
| 2,950,735 | 8/1960 | Streeter | 138/46 X |
| 3,441,246 | 4/1969 | Lauppe et al. | 251/129.17 X |
| 4,378,766 | 4/1983 | Yamazoe et al. | 123/339 |

FOREIGN PATENT DOCUMENTS 18173  2/1981  Japan .............................. 251/129.17

Primary Examiner—Tony M. Argenbright
Attorney, Agent, or Firm—Martin A. Farber

[57] ABSTRACT

In a setting member for controlling the quantitative flow of a fluid, particularly for the regulating of the idling speed of an internal combustion engine, having an electromagnet and an armature which is movable by the electromagnet in opposition to the force of a spring, a first hollow space to which the fluid can be fed and a second hollow space from which the fluid can be removed are connected to each other by a constriction through which a piston attached to the armature passes upon movement between a position in current-less state and the greatest deflection of the armature. In the case of the failure of the current fed to the electromagnet a medium quantity of flow is established.

6 Claims, 1 Drawing Sheet

SETTING MEMBER FOR CONTROLLING THE QUANTITATIVE FLOW OF A FLUID

FIELD AND BACKGROUND OF THE INVENTION

The present invention relates to a setting member for controlling the quantitative flow of a fluid, in particular for regulating the idling speed of an internal combustion engine, having an electromagnet and an armature which is movable by the electromagnet against the force of a spring.

With the electronic control of the idling speed of rotation of internal combustion engines, the engine speed of rotation upon idling is maintained constant even under the influence of changes in load. The electronic controller determines the instantaneous speed of rotation of the engine for instance from the ignition pulses, compares it in the idling range with the predetermined desired speed of rotation and supplies a pulse width-modulated signal to the setting member. This setting member controls the quantitative flow in a bypass which lies in parallel to the throttle valve. The setting member changes its effective cross section of opening in accordance with the current given off by the controller (average value) and doses the quantity of air so as to maintain a constant idling speed of rotation of the engine.

In one known setting member for the regulation of idling a piston is so displaced by means of an electromagnet the force of a spring that it increasingly releases flow openings with increasing deflection. If however, no current is fed to the electromagnet during operation in idling, as can take place by a defect in the electronic controller or in the line connections, then the setting member is brought into the closed position by the spring. Thus, the smallest possible amount of air is set, namely, merely the amount of air which is passed through the remaining gap between the closed throttle valve and the intake tube. This amount of air however is not sufficient to be able to operate the engine in idling under different operating conditions.

If, for instance, the control range of the idling control is so designed that with minimum load on the engine and therefore with optimum operating temperature and the absence of additional loads such as for instance an air conditioner or an automatic transmission, a slight idling speed of rotation is still adjusted, then, within the known setting member in the case of lower operating temperature or with gear engaged (automatic transmission), the engine would stop in the case of the failure of the electronic control.

SUMMARY OF THE INVENTION

It is an object of the present invention to provide a setting member which does not enter into the position of minimum flow upon failure of the current.

According to the invention, a first hollow space (3) to which the fluid can be fed and a second hollow space (4) from which the fluid can be obtained are connected to each other by a constriction (5) through which a piston (6) attached to the armature (9) passes upon the movement between a position in a current state and the maximum deflection of the armature (9).

One particularly favorable further development resides in the piston (6) being movable linearly and having the shape of a circular disk.

Another further development is that the hollow spaces (3,4) are substantially co-axial hollow cylinders which are separated by a partition wall (5) having a hole. Both further developments substantially facilitate the manufacture of a setting member according to the invention with the known methods, materials and parts which have proven their suitability in known setting members.

A further development of the setting member of the invention resides in the fact that the free cross section of flow released by the piston (6) and the constriction (5) in the position, a current-less position, has a value which is between the minimum value and the maximum value which is present upon the greatest deflection of the piston (6).

Such a development is advantageous in particular in connection with the adjustment of the idling speed of internal combustion engines so that, in case of failure of the control, there is established an amount of air which provides a reasonable, even though not optimal, idling speed of rotation under practically all operating conditions which occur.

Finally, another further development of the invention is the provision of an adjustable stop (12,13) for the position of the armature in the current-less condition.

BRIEF DESCRIPTION OF THE DRAWINGS

With the above and other objects and advantages in view, the present invention will become more clearly understood in connection with the detailed description of preferred embodiments, when considered with the accompanying drawing, of which

Identical parts are provided with the same reference numbers in the figures.

DETAILED DESCRIPTION OF THE PREFERRED EMBODIMENT

Figure 1:
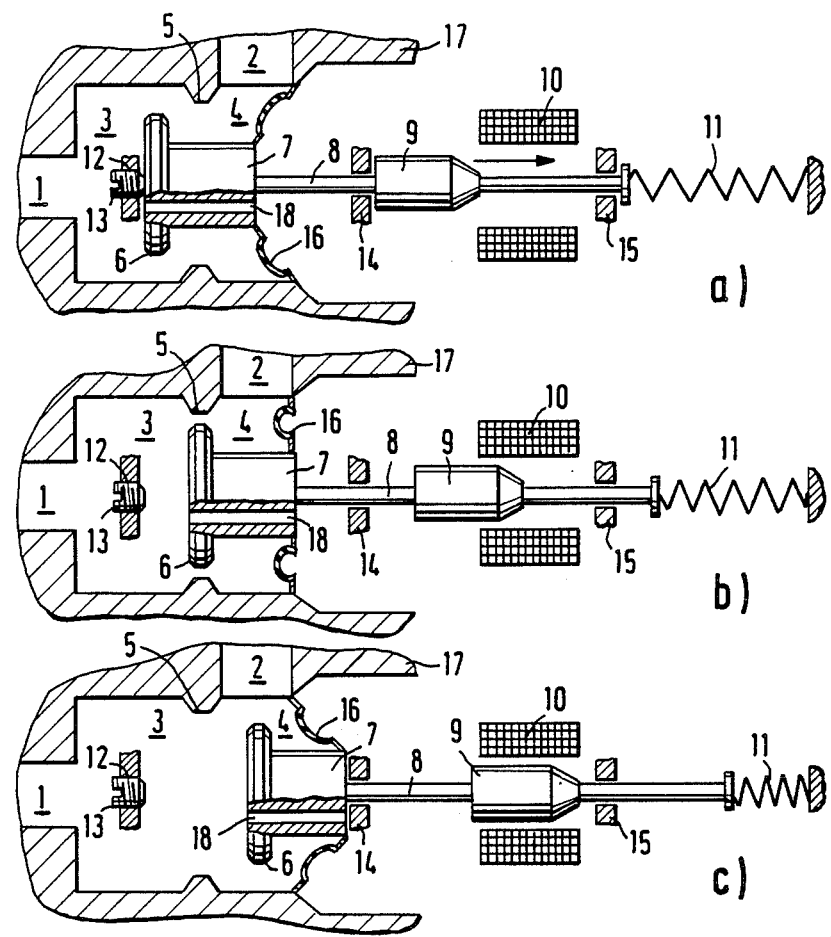
FIGS. 1a, 1b and 1c are simplified sectional views of an embodiment in several positions.

FIGS. 1A-1C show the embodiment merely to the extent necessary in order to explain the invention. Surrounding edges which are actually visible in a sectional view have been omitted for the sake of clarity. In this connection the air feed 1 is connected with the intake port of an internal combustion engine in front of the throttle valve and the outlet opening 2 is connected with the intake port behind the throttle valve. Between the cylindrical hollow spaces 3 and 4 formed by the housing 17 there is provided a constriction 5, the diameter of which is somewhat larger than the diameter of the piston 6 which has the shape of a circular disk. The piston 6 furthermore has a cylindrical part 7 and it is arranged on a piston rod 8 which furthermore bears an armature 9 which is movable in the direction of the arrow against the force of a coil spring 11 by means of an electromagnet 10.

In the current-less condition the coil spring 11 pushes the piston 6 against a stop 12 which is adjustable by means of a screw 13. Guide elements 14, 15 for the piston rod have been shown merely schematically.

In the case of the setting member shown, a membrane 16 is provided between the cylindrical piston part 7 and the housing 17, the membrane closing off the second hollow space 4. Since a higher pressure prevails in the first hollow space 3 than in the second hollow space 4, the difference depending inter alia on the position of the piston 6, at least one bore hole 18 is provided in known manner in the piston and in the cylindrical piston part 7 through which bore hole pressure equalization takes place between the first hollow space 3 and the hollow space adjoining the membrane 16. In this way, the force acting as a result of the pressure difference on the piston 6 is compensated for so that the position of the piston 6 is determined solely by the spring constant and the electric current.

FIG. 1a shows the setting member in current-less condition. Aside from the fact that this position is assumed when the engine is stopped, this is the position for the event that the electronic control system has a defect, which is recognized by means of a testing system. The current I fed to the setting member is then disconnected so that the spring 11 presses the piston 6 against the stop 12 and the cross section of flow is thus greater than the minimum value which results when the piston 6 is in the same plane as the constriction 5. By means of the screw 13 the position of the piston can be so adjusted that the engine assumes a medium idling speed of rotation so that it neither stops nor assumes a very high idling speed of rotation under most operating conditions which occur even upon failure of the electronic control.

FIG. 1b shows a position of the piston which results in the minimum flow. Upon further increase of the current I through the coil 10, the piston is moved towards the right, as shown in FIG. 1c as a result of which the free cross section between the piston 6 and the constriction 5 is increasingly enlarged. The operating range of the setting member for the electronic control is located within this range of deflection.

Figure 2:
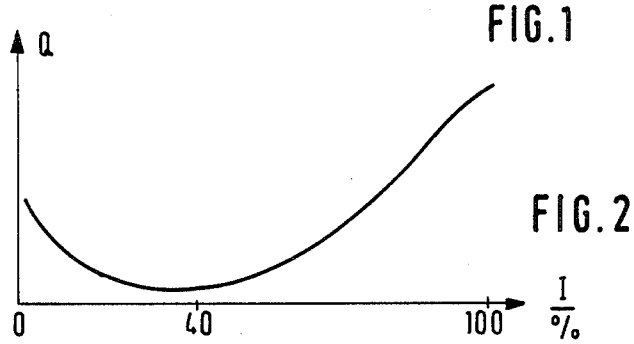
FIG. 2 is a graph which shows the dependence of the quantitative flow on the current which is fed to the electromagnet.

FIG. 2 shows the function of the amount of air Q as a function of the current I. An average amount of air establishes itself in current-less condition. In the case of an actual setting member developed in accordance with the invention, the minimum of the curve lies somewhat below 40%, after which the curve rises up to 100% of the current provided. The operating range for the electronic control therefore extends over a current range of 40 to 100%.

We claim:

1. In a setting device for controlling the quantitative flow of a fluid, in particular for regulating idling speed of an internal combustion engine, the setting device having an electromagnet and an armature which is movable by the electromagnet against the force of a spring, the improvement wherein the setting device further comprises:

an enclosure defining a first hollow space to which the fluid can be fed and a second hollow space from which the fluid can be extracted;

a constriction disposed within said enclosure for joining said first hollow space with said second hollow space;

a piston secured to said armature and movable through said constriction by said armature from a first position in one of said hollow spaces in which the armature is free of an electric current to a second position in another of said hollow spaces at maximum deflection of the armature wherein said armature is activated by the electric current; and a stop defining said first position, said spring urging said piston against said stop in said first position to provide a larger volume of fluid flow at said first position than a volume of fluid flow occurring during passage of said piston in said constriction.

2. The setting device according to claim 1, wherein said piston is movable linearly and has the shape of a circular disk.

3. The setting device according to claim 2, wherein said enclosure has interior cylindrical surfaces; and said first and said second hollow spaces are bounded by substantially co-axial hollow cylindrical surfaces of said enclosure, said constriction comprising a partition wall having a hole, said wall separating said hollow spaces.

4. The setting device according to claim 1, wherein a free cross section of fluid flow regulated by said piston and said constriction in said first position has a value which is between the minimum value and the maximum value of fluid flow.

5. The setting device according to claim 1, wherein said stop is adjustable to limit movement of said piston in said first position of the armature in a current-less condition.

6. The setting device according to claim 1, wherein said electromagnet comprises a single electromagnet coil.

* * * * *